(12) United States Patent
Richard

(10) Patent No.: US 6,638,450 B2
(45) Date of Patent: Oct. 28, 2003

(54) METHOD FOR MANUFACTURING AN INJECTION MOLDED THERMOPLASTIC OPHTHALMIC LENS HAVING AN ENCAPSULATED LIGHT POLARIZING ELEMENT

(75) Inventor: David A. Richard, Shingles Springs, CA (US)

(73) Assignee: VTEC Technologies, Inc., Chestnut Hill, MA (US)

( * ) Notice: Subject to any disclaimer, the term of this patent is extended or adjusted under 35 U.S.C. 154(b) by 0 days.

(21) Appl. No.: 09/951,661

(22) Filed: Sep. 10, 2001

(65) Prior Publication Data

US 2002/0050658 A1 May 2, 2002

Related U.S. Application Data

(60) Provisional application No. 60/245,091, filed on Nov. 2, 2000.

(51) Int. Cl.[7] .............................................. B29D 11/00
(52) U.S. Cl. .................. 264/1.32; 364/1.7; 364/2.2; 364/2.4; 425/128; 425/808
(58) Field of Search ...................... 264/1.1, 1.7, 2.3, 264/2.4, 2.7, 2.2, 1.32, 1.34, 320.7; 425/808, 810, 121, 555, 125, 128

(56) References Cited

U.S. PATENT DOCUMENTS

| | | |
|---|---|---|
| 3,674,587 A | * 7/1972 | Laliberte |
| 4,828,769 A | * 5/1989 | Maus et al. .................. 264/2.2 |
| 4,873,029 A | 10/1989 | Blum |
| 5,232,637 A | 8/1993 | Dasher et al. |
| 5,286,419 A | 2/1994 | van ligten et al. |
| 5,312,689 A | 5/1994 | Dasher et al. |
| 5,368,790 A | 11/1994 | Greshes |
| 5,434,707 A | 7/1995 | Dalzell et al. |
| 5,630,967 A | 5/1997 | Greshes |
| 5,751,481 A | 5/1998 | Dalzell et al. |
| 5,757,459 A | * 5/1998 | Bhalakia et al. |
| 5,805,336 A | 9/1998 | Dalzell et al. |
| 5,997,139 A | 12/1999 | Yasuda |
| 6,074,579 A | 6/2000 | Greshes |
| 6,177,032 B1 | 1/2001 | Smith et al. |
| 6,180,033 B1 | 1/2001 | Greshes |

* cited by examiner

Primary Examiner—Mathieu D. Vargot

(57) ABSTRACT

A method for manufacturing a synthetic resin thermoplastic ophthalmic lens by injecting a thermoplastic material immediately adjacent to each side of a light polarizing wafer situated within a mold cavity. The light polarizing wafer includes tab appendages which are positionable into registration notches in the mold cavity in order to maintain the wafer in a desired position in the mold during lens formation. The thermoplastic material is then injected around the light polarizing wafer, whereupon a compression procedure is implemented where the contents of the mold cavity are compressed. The mold cavity is compressed to a predetermined position to achieve a desired shape of the lens. Uniform compression is exerted over the entire surface of lens during the compression procedure, resulting in all stresses being uniformly distributed over the lens surface to significantly negate stress-inducted birefringence in the formed ophthalmic lens.

22 Claims, 3 Drawing Sheets

METHOD FOR MANUFACTURING AN INJECTION MOLDED THERMOPLASTIC OPHTHALMIC LENS HAVING AN ENCAPSULATED LIGHT POLARIZING ELEMENT

RELATED APPLICATIONS

This application is a continuation of U.S. Provisional Patent Application Ser. No. 60/245,091, filed Nov. 2, 2000.

BACKGROUND OF THE INVENTION

1. Field of the Invention

The present invention relates generally to an injection molded thermoplastic ophthalmic lens. More particularly, the present invention is directed to an improved method for manufacturing an injection molded thermoplastic ophthalmic lens having an encapsulated light polarizing element.

2. Description of Related Art

There are numerous advantages associated with using highly transparent, optical quality plastic in place of glass when forming ophthalmic lenses. Plastic lenses are lighter, tougher, and less likely to fracture than glass lenses. Further, plastic lenses are processed quite differently than those of glass. The elevated temperatures necessary for the manufacture of a glass ophthalmic grade lens are not required to process a plastic ophthalmic grade lens. The secondary processing necessary for the addition of a prescription to the thermoplastic ophthalmic lens are greatly reduced due to the reduction in the need for the extensive grinding and polishing operations required to be performed on glass lenses. One such glass lens is disclosed in U.S. Pat. No. 3,051,054 issued to Crandon on Aug. 28, 1962 where a glass element is utilized in construction of a dichroic polarized wafer assembly. As previously stated, the prohibitive cost of the processing of both the glass/wafer composite structure and the subsequent secondary processing difficulties makes it undesirable to manufacture such a glass lens. Also, the exposure of the polarized portion of the glass lens to abrasion and weathering reduces the expected life of the glass lens element.

Plastic, synthetic resin ophthalmic lenses have historically been manufactured through the use of an injection molding machine to inject a synthetic, thermoplastic, optically clear, resin material into a mold that has anterior and posterior optically correct, polished insert surfaces. Within such mold, a light polarizing shaped wafer is positioned to allow the injected thermoplastic material to flow directly adjacent to the light polarizing shaped wafer's anterior and posterior surfaces. This typically involves the injection of a thermoset monomeric material immediately adjacent to each side of a light polarizing element secured in the mold, such as disclosed by U.S. Pat. No. 3,833,289, issued to Schuler on Sep. 3, 1974. In such a method, a light polarizing element having projections about its periphery to provide a predetermined distance between at least one face of the light polarizing element and a complimentary mold component is positioned into a resilient mold component. This same result can be accomplished by providing a shim of a predetermined thickness between the mold component and the polarized wafer.

It has been found that utilizing this method of molding ophthalmic lens structures, under certain circumstances, causes free monomer or other uncatylyzed constituents of these components to migrate from the monomeric materials that make up these structures into the light polarizing element. Such migration into the light polarizing element which forms an integral component of the ultimately formed lens thereby dexterously affects the light polarizing element by bleaching some of the dyes comprising the element, where the migration of the monomer into the light polarizing element can cause it to deform and buckle. In addition, plasticizer components of the spacing structures were sometimes found to migrate therefrom into the polymerizing monomer which causes the formation of a "softened" polymeric material generally containing striations and haze.

There is clearly a need for an improved method of forming an injection molded thermoplastic ophthalmic lens which obviates the migration of catalysts, monomeric materials, and plasticizers into the light polarizing element. Further, there is a need for an improved method of forming an injection molded thermoplastic ophthalmic lens which eliminates the necessity for adjunct support and spacing mechanisms for a light polarizing element within the mold which can lead to such migrations.

SUMMARY OF THE INVENTION

The foregoing shortcomings and disadvantages of the prior art are alleviated by the present invention which provides an improved method of manufacturing a light polarizing, laminated, ophthalmic lens made up of thermoplastic synthetic resin. The improved method of the present invention provides for precision placement of a light polarizing element within an injection mold prior to and during the molding process along with a unique injection/compression molding procedure following injection of the thermoplastic material.

The method for manufacturing a synthetic thermoplastic resin ophthalmic lens according to the present invention comprises the injection of a thermoplastic resin material immediately adjacent to each side of a light polarizing element or wafer secured and oriented within a mold cavity. The wafer is formed having spaced-apart projections extending outwardly from its periphery which are positionable into registration notches in the mold cavity in order to maintain a desired position of the wafer within the mold during the lens formation process. A melted thermoplastic material is then injected into the mold cavity at low pressure about anterior and posterior surfaces of the wafer. Once a desired amount of thermoplastic material has been injected into the mold cavity, a compression procedure is implemented where at least one of the mold surfaces is moved in the direction of the other mold surface to compress the contents of the mold cavity. The mold cavity is compressed to a predetermined position to achieve a desired thickness and shape of the lens, where uniform compression is exerted over the entire surface of the lens during the compression procedure. As a result of the uniform compression, all stresses are uniformly distributed over the lens surface to significantly negate stress-inducted birefringence.

The combination of precisely positioning the wafer within the mold, injecting optical quality thermoplastic material under low pressure into the mold, and uniform post-injection compression of the mold cavity area provides a thermoplastic ophthalmic lens free of process constituent migration problems associated with the wafer registration in the mold. Further, the formed thermoplastic ophthalmic lens exhibits a low occurrence of defects due to the positioning and anchoring of the wafer, thus minimizing birefringence. The improved method of forming a thermoplastic ophthalmic lens of the present invention additionally ensures adequate adhesion between the components of the composite structure and provides a finished lens having uncompromised optical clarity.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved method for manufacturing an injection molded thermoplastic ophthalmic lens.

Figure 1:
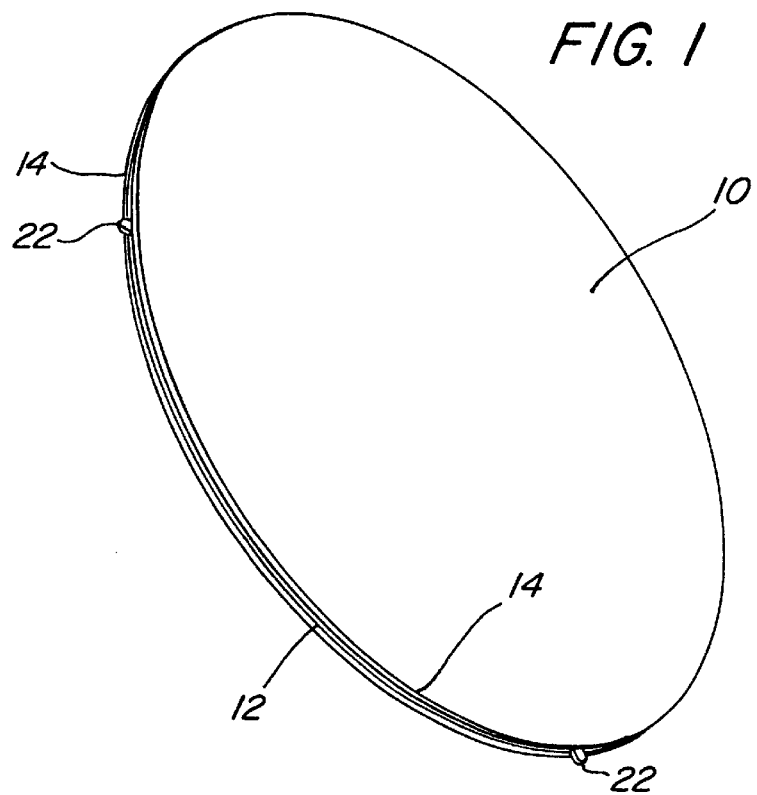
FIG. 1 is a perspective view of a preferred embodiment of a thermoplastic ophthalmic lens formed in accordance with the present invention.
Figure 2:
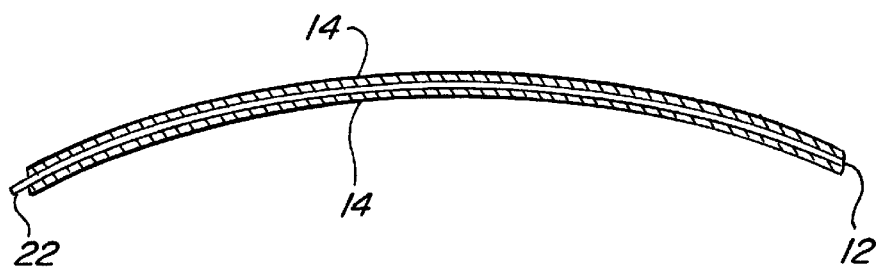
FIG. 2 is a cross-sectional side view of the thermoplastic ophthalmic lens of FIG. 1.

Referring now to FIGS. 1 and 2, a perspective view of a preferred embodiment of a thermoplastic ophthalmic lens 10 formed in accordance with the present invention is illustrated. According to the preferred embodiment of the present invention, the ophthalmic lens 10 is formed having a thermoplastic synthetic resin 14 encapsulating a light polarizing wafer 12. The thermoplastic resin 14 is preferably a polycarbonate material, such as 4',4'-dihydroxy-diphenyl-2,2-propane (bisphenol A) or other similar polycarbonate. The selection of the preferred light polarizing wafer 12 constituent is defined by the desired level of colored interference fringes to be present in the light polarizing wafer 12. Any manner of measuring colored interference fringes in a light polarizing wafer 12 may be utilized. One manner of measuring the occurrence and degree of colored interference fringes is disclosed in U.S. Pat. No. 5,051,309 issued to Kawaki et al. on Sep. 24, 1991, the disclosure of which is hereby incorporated by reference. For the ophthalmic lens 10 of the present invention, the light polarizing wafer 12 should preferably contain no more than very slightly colored interference fringes which cause no problems in practice, while preferably containing hardly any color interference fringes.

Any suitable light polarizing wafer 12 material which will produce the desired light polarization effect may be utilized in the context of the present invention. The preferred material for the light polarizing wafer 12 is a transparent sheet of polyvinyl alcohol containing substantially oriented molecules of dehydrated polyvinyl alcohol, where the wafer 12 derives its light polarizing properties from the dehydrated molecules. The manufacture and utilization of such sheet materials may be appreciated with reference to U.S. Pat. Nos. 2,173,304; 2,255,940; 2,306,108; 2,445,555; 2,453,186; 2,674,159, the disclosures of which are hereby incorporated by reference. Among other materials which may be utilized for the light polarizing wafer 12 are, for example, polyvinyl butyral and polyvinyl alcohol, used in conjunction with a dichroic stain, such as disclosed in U.S. Pat. No. 5,051,309, the disclosure of which is hereby incorporated by reference. Also, the fabrication of the light polarizing wafer 12 may be accomplished using any known pressing or forming method, such as the method described in U.S. Pat. No. 3,786,119, hereby incorporated by reference.

Figure 3:
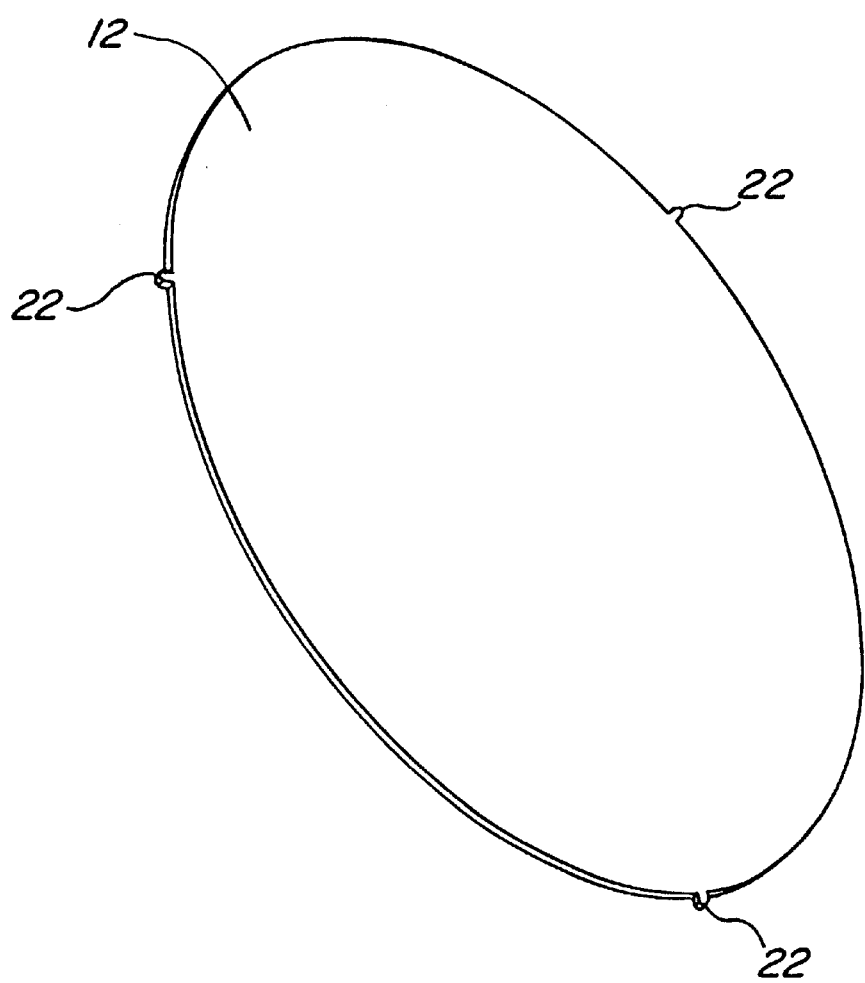
FIG. 3 is a perspective view of a preferred embodiment of the light polarizing element encapsulated within the thermoplastic ophthalmic lens formed in accordance with the present invention.

With reference to FIG. 3, it can seen that the light polarizing wafer 12 is formed to include a plurality of spaced-apart wafer tab protrusions or appendages 22 extending outwardly from its periphery. The wafer tab appendages 22 are utilized to retain the light polarizing wafer 12 in a desired position within a mold during the ophthalmic lens 10 formation process. It should be appreciated that the light polarizing wafer 12 may be formed to possess various diopters of curvature, where such curvatures will generally conform to the desired curvature of the anterior or generally convex surface of the finished ophthalmic lens 10.

In another preferred embodiment of the present invention, a tie-bond coating (not shown) may be positioned between the light polarizing wafer 12 and the surrounding thermoplastic polymeric layer 14. Any material which will increase the adhesion of the light polarizing wafer 12 to the thermoplastic polymeric layer 14 without deleteriously affecting the final structure of the lens 10 is suitable for use as the tie-bond coating. It has been found that cellulose nitrate produces excellent results when used in this environment, especially when used in conjunction with, for example, a melamine-formaldehyde condensation polymer.

Figure 5:
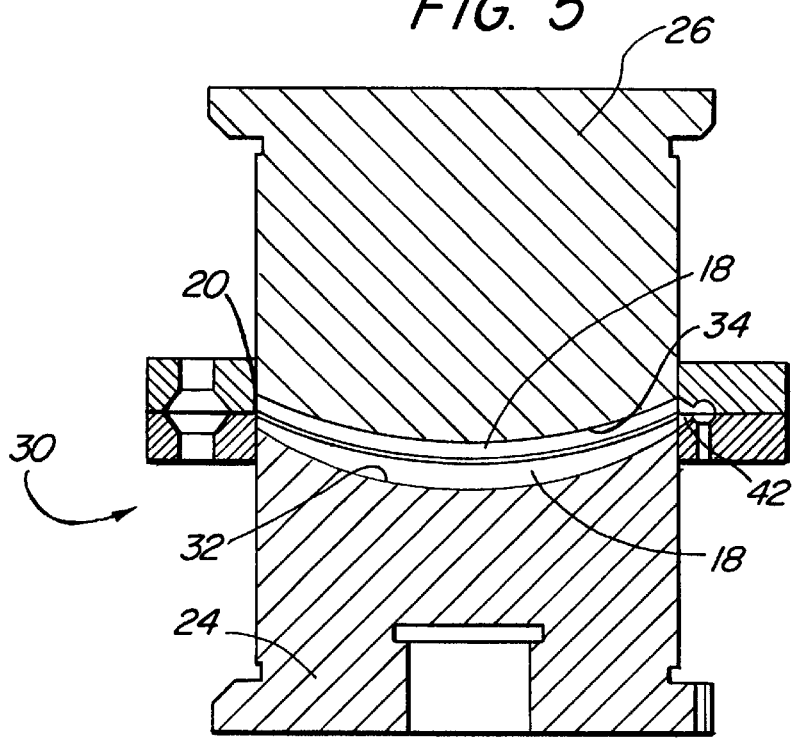
FIG. 5 is a cross-sectional side view of the mold of FIG. 4.
Figure 4:
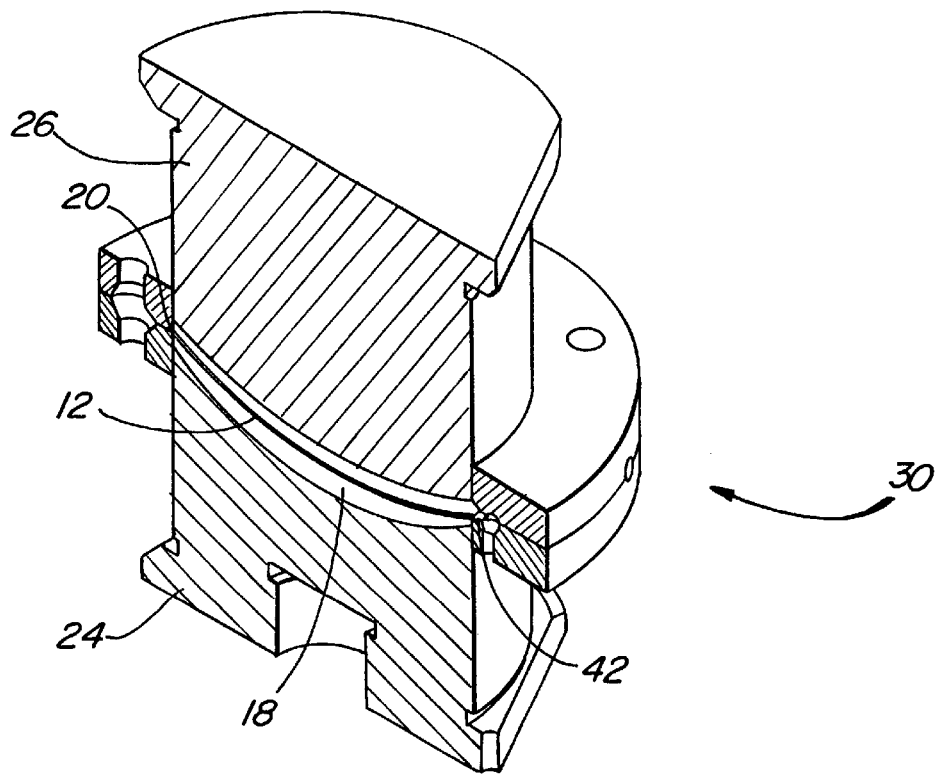
FIG. 4 is a partial cutaway perspective view of a preferred embodiment of a mold used in forming a thermoplastic ophthalmic lens in accordance with the present invention.

The present invention substantially utilizes a conventional injection molding machine for manufacturing the ophthalmic lens 10 by introducing thermoplastic resin 14 into an injection mold optical cavity. However, the present invention improves upon the conventional injection molding machine by including an additional injection/compression component. As shown in FIGS. 4 and 5, the light polarizing wafer 12, having a preferred thickness of approximately 0.6 to 0.8 millimeters, is placed within a mold 30 having adjoining components 24 and 26. Each of the components 24 and 26 possess respective corrected, polished surfaces 32 and 34 which form the mold cavity 18 capable of producing quality optical replications.

The injection mold 30 of present invention provides a novel manner of injecting thermoplastic, synthetic, optically correct resin 14 into the mold cavity 18 formed with the structure of rigid components having various peripheral and surface figure geometry's. The principle features of the invention are that the light polarizing wafer 12 has an integral means, namely wafer tab appendages 22, for assuring that a predetermined distance be maintained between its anterior and posterior faces and the respective anterior and posterior internal mold surfaces 32 and 34 adjacent thereto. The mold 30 is capable of completing the thermoplastic polymerization process of the ophthalmic lens 10 to control the symmetrical relationship of the light polarizing wafer 12 to the internal mold surfaces 32 and 34. The mold 30 is further capable of maintaining the mechanical geometry of the thermoplastic molded lens 10 without inducing birefringence into the final cured lens 10.

The mold 30 further possesses registration notches or details 20 formed in either or both of the mold components 24, 26 for receiving the wafer tab appendages 22 extending from the light polarizing wafer 12. The positioning of the wafer tab appendages 22 within respective registration details 20 in the mold 30 ensure the proper pitch, yaw and predetermined distance between the faces of the light polarizing wafer 12 and the mold component anterior surface 32 and posterior surface 34 adjacent thereto. The preferred offset from the convex posterior surface 34 is approximately between 0.2 to 15.0 millimeters. The light polarizing wafer 12 is positioned within the injection mold cavity 18 in a manner so as to leave a gap between the light polarizing wafer 12 and the mold surfaces 32 and 34. This gap allows the semi-polymerized thermoplastic synthetic resin 14 to flow between the light polarizing wafer 12 and the mold surfaces 32 and 34. The positioning of the light polarizing wafer 12 within the mold assembly 30 depends upon the preferred type and shape of lens being constructed. The cavity depth and insert spacing within the mold 30 create the gap between the mold surfaces 32 and 34, thus imparting a desired thickness to the formed ophthalmic lens 10. The mold component halves 24 and 26 are held together during the injection and curing process by molding machine clamp platens.

The rear mold component 26 includes a smooth, convex surface 34 against which the thermoplastic synthetic resin 14 is contacted. The convex surface 34 imparts a smooth, concave optical finish to the ophthalmic lens 10 rear surface. The front mold component 24 includes a smooth, concave surface 32 against which the thermoplastic synthetic resin 14 is contacted. The smooth, concave surface 32 imparts a smooth, convex optical finish to the ophthalmic lens 10 front surface. In the preferred embodiment of the lens mold assembly 30 of the present invention, the front, convex surface of the light polarizing wafer 12 is spaced from the smooth concave surface 32 of the front surface mold insert 24 by about 0.2 to 1.2 millimeters. The positioning insures that the finished un-cut spectacle lens blank, as shown in FIG. 1, can be made to a minimum thickness of 1.8 millimeters over the cross section of the lens. The positioning also insures that the lens 10 includes a reserve thickness at the concave rear surface of the finished lens 10 of approximately 0.2 to 0.3 millimeters.

The actually positioning of the light polarizing wafer 12 in the injection mold 18 will depend upon the particular ophthalmic lens 10 being manufactured and its desired optical qualities. For instance, the light polarizing wafer can be positioned at any point within the formed ophthalmic lens 10. When determining where to position the light polarizing wafer within the lens 10, it must be kept in mind that the light polarizing effect of the wafer 12 can be decreased if the wafer 12 is positioned too far from the front surface of the lens 10. The decrease in polarizing effect is a particular problem when the lens thermoplastic synthetic resin becomes birefringent under stress from conventional molding possesses. If too great a thickness of thermoplastic resin 14 is in front of the light polarizing wafer 12, the light will get polarized in different directions, including a radial direction. The extent of polarization depends upon the thickness of the thermoplastic resin 14 and the stress-caused birefringence to which the lens 10 is subjected. These things can cause the light that was linearly polarized in a direction perpendicular to the pass direction of the light polarizing wafer 12 to now be polarized parallel to that direction and passed by the light polarizing wafer, resulting in no light extinction taking place. The present invention avoids these problems associated with stress-induced birefringence by utilizing a unique injection/compression technique.

Once the light polarizing wafer 12 has been properly positioned with the registration notches 20 within the mold cavity 18, the injection mold 30 is closed and the injection mold cavity is injected with thermoplastic synthetic resin 14 which surrounds and imbeds the light polarizing wafer 12. The injection procedure encompasses initially heating and melting the process thermoplastic material 14, and then mixing and homogenizing the resultant liquid thermoplastic material. The liquid thermoplastic resin 14 passes through the gaps between the wafer 12 and the anterior mold component 24 and the posterior mold component 26.

The filled mold cavity 18 is then subjected to a compression procedure once a desired amount of melted thermoplastic material has been injected into the mold cavity 18. The mold cavity 18 is compressed by moving at least one of the mold components 24, 26 toward the other. The thermoplastic material 14 is then cooled and solidified while under compression in the mold cavity 18 at the end position of the mold components 24, 26. In this manner, the injection/compression procedure requires that the thermoplastic material 14 undergo two phase changes during the cycle. The thermoplastic material 14 is first heated from a solid state to form a viscous liquid melt for injection into the mold after which the melt is converted back into a solid state by cooling in the mold under secondary compression.

In selecting polycarbonate as a preferred optical grade material for the thermoplastic material 14, it is understood that all plastics are governed by the thermodynamic principles which are basic to the chemical structure of each. In the melting of various thermoplastics, the quantity of heat required per unit weight may vary significantly depending on the differences in heat capacity of the various thermoplastics. These characteristics also define the control which the process and mold design have over molecular orientation in the processing of optical lenses.

While it is understood that movement of either or both of the mold components 24, 26 may be employed to compress the mold cavity 18, the mold cavity 18 is preferably compressed by dynamically moving, under hydraulic pressure, the posterior mold component 26 toward the anterior mold component 24 after the injection phase has been completed. The mold component 26 starts to compress the contents of the mold cavity 18 simultaneously with cessation of the injection of the thermoplastic material 14. At the point that the injection procedure is halted, the thermoplastic material residing within the gate portion of the mold assembly 30 immediately solidifies and blocks the retreat of thermoplastic material back through the gate opening. Prior to the thermoplastic material temperature declining below its glass transition temperature, the posterior component 26 reaches a predetermined position such that the entire rear surface of the lens 10 is subjected a desired amount of compression. Uniform compression is exerted over the entire rear surface 40 of the lens 10. As a result of the uniform compression, all stresses are distributed uniformly over the entire area of the parts surface, significantly negating stress induced birefringence.

The construction of the injection mold 30 of the present invention incorporates unique characteristics that differ considerably from that of conventional injection mold constructions. While conventional injection molds utilize stationary inserts and the use of injection packing pressures to complete the fill cycle of the thermoplastic material injection process, the present invention incorporates dynamic components that allow for the reduction of injection pressures during the molding process while integrating exceptional control over the part volume and the ability to molecularly replicate the tooling surfaces of mold components 24, 26. The tooling also has incorporated within its design and construction, registration notches 20 and a flow control gate 42 features atypical to conventional mold designs in the current state of the art.

The flow control gate 42 is designed to possess a geometry causing the thermoplastic material to be injected into the mold cavity 18 at low velocity and low pressure. The thermoplastic material is preferably injected into the mold cavity 18 at a flow rate between approximately 0.8 g/min and 3.5 g/min. The flow control gate 42 further causes the molecular chain of the thermoplastic material to remain disoriented while directing the thermoplastic resin flow uniformly around the wafer 12 within the mold cavity 18. The flow control gate 42 maintains these flow features of the thermoplastic material while exhibiting a low profile to facilitate quick solidification of the thermoplastic material in the flow control gate 42 upon the stoppage of injection of thermoplastic material through the gate 42. The quick solidification of the thermoplastic material in the flow control gate 42 upon the stoppage of flow prevents the flow of thermoplastic material back from the mold cavity 18 through the flow control gate 42 during compression.

Upon completion of the cure stage within the injection mold 30, the mold 30 is opened and the ophthalmic lens 10 is ejected from the injection mold 30. Once removed from the mold 30, the light polarizing lens 10 is preferably treated with an abrasion resistant coating. The abrasion resistant coating is acceptably applied to the lens 10 by one of several conventional techniques that include organic coating by spin, flow, spray or dip coating, vacuum coating chemical vapor deposition coating, or chemical coating. An organic abrasion coating can also be applied by coating the mold cavity surfaces 32, 34 before the wafer 12 is inserted and the injection molding process undertaken.

The plastic ophthalmic lens 10 is capable of having a minimum thickness of 1.8 millimeters for the entire cross sectional thickness of the lens 10, such as when the plastic ophthalmic lens 10 is made as a spectacle lens, due to the uniqueness of the injection/compression procedure of the present invention that allows for thickness sizing and birefringence control during the curing process. The plastic ophthalmic lens 10 of the present invention resists hazing and does not noticeably discolor during the in-mold polymerization of the thermoplastic synthetic resin 14. The plastic ophthalmic lens 10 of the present invention further does not delaminate. The lens 10 includes a smooth convex anterior surface and a concave posterior surface free of surface cylinder in the case of a finished un-cut lens 10. In the instance of a semi-finished blank, as shown in FIG. 4, the convex anterior front surface 24 is free of cylinder as is the concave posterior surface 26 free of unintentional cylinder after mechanical surface processing of the lens 10. The plastic ophthalmic lens 10 of the present invention may comprise a single vision lens, a bifocal lens, a trifocal lens, a multi-segment lens, a blended segment lens or a progressive lens, and in the case of "finished uncut" lenses, cylinder surface figures may be molded into the rear surface of the lens.

The present invention overcomes the problems of poor mold surface replication and residual part stresses by the molded thermoplastic ophthalmic lens 10, and more specifically to maximize micro-replication of the finest surface detail and figure onto an optical grade thermoplastic injection molded product such as optical spectacle lenses. Adjunct to the creation of a thermoplastic light polarizing spectacle lens with reduced birefringence, the process also creates a processing environment that renders uniformity to part-to-part density thus controlling the parts clarity and weight.

In each of the above embodiments, the different structures of the multi-layer coating are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method of forming an injection molded thermoplastic ophthalmic lens, comprising the steps of:
   positioning a light polarizing wafer within a mold cavity of an injection mold;
   injecting a thermoplastic material into the mold cavity around the light polarizing wafer; and
   compressing the mold cavity to a predetermined position where the thermoplastic material solidifies to form an ophthalmic lens having a light polarizing wafer encapsulated by thermoplastic material, wherein the light polarizing wafer includes a plurality of tab appendages extending from its outer periphery and the light polarizing wafer is positioned within the mold cavity by situating the tab appendages into registration notches formed in the injection mold.

2. The method of claim 1, wherein the injection mold includes adjoining anterior and posterior mold components which form the mold cavity there between, wherein the step of compressing the mold cavity comprises moving at least one of anterior and posterior mold components toward the mold component.

3. The method of claim 1, wherein compression of the mold cavity begins once injection of the thermoplastic material is completed.

4. The method of claim 1, wherein situating the tab appendages of the light polarizing wafer into the registration notches maintains the light polarizing wafer in a desired position throughout the lens forming process.

5. The method of claim 1, wherein the amount of thermoplastic material injected into the mold cavity and the amount which the mold cavity is compressed may be variably controlled to obtain a desired shape and desired birefringence of the ophthalmic lens.

6. The method of claim 1, wherein uniform compression is exerted over an entire surface of the lens from the dynamically moveable mold component in order to uniformly distribute stresses and minimize stress induced birefringence in the lens.

7. The method of claim 1, further comprising the step of applying a tie-bond coating over the light polarizing wafer prior to injecting the thermoplastic material around the light polarizing wafer in order to increase the adhesion between the light polarizing wafer and the thermoplastic material.

8. The method of claim 1, wherein the thermoplastic material is injected into the mold cavity through a mold cavity flow control gate at low pressure and low velocity.

9. The method of claim 8, wherein the thermoplastic material is injected through the flow control gate possessing a disoriented molecular chain structure while exhibiting a low profile to facilitate quick solidification within the flow control gate upon the stoppage of injecting the thermoplastic material.

10. The method of claim 9, wherein the quick solidification of the thermoplastic material in the flow control gate upon the stoppage of flow prevents the flow of thermoplastic material back from the mold cavity through the flow control gate during compression.

11. The method of claim 8, wherein the thermoplastic material is injected through the mold cavity gate at a flow rate between approximately 0.8 g/min and 3.5 g/min.

12. The method of claim 1, further comprising applying an abrasion-resistant coating to at least one of the outer surfaces of the ophthalmic lens.

13. The method of claim 12, wherein the abrasion-resistant coating is applied after removing the ophthalmic lens from the injection mold.

14. The method of claim 12, wherein the abrasion-resistant coating is applied by coating the mold cavity surfaces of the anterior and posterior mold components with the abrasion-resistant coating prior to positioning the light polarizing wafer within the mold cavity.

15. An injection mold for forming a thermoplastic ophthalmic lens, comprising:

an anterior mold component having a mold cavity surface;

a posterior mold component having a mold cavity surface, wherein the anterior and posterior mold components are adjoining to form a mold cavity between their respective mold cavity surfaces;

registration notches formed in at least one of the anterior and posterior mold components for receiving tab appendages from a light polarizing wafer and for retaining the light polarizing wafer in a desired position within the mold cavity; and a flow control gate for injecting thermoplastic material into the mold cavity;

wherein at least one of the anterior mold component and the posterior mold component are dynamically moveable toward the other mold component for compressing the contents of the mold cavity.

16. The injection mold of claim 15, wherein the flow control gate injects thermoplastic material around a light polarizing wafer after its tab appendages have been situated within respective registration notches in the injection mold.

17. The injection mold of claim 16, wherein the compression of the mold cavity begins when injection of the thermoplastic material into the mold cavity ceases.

18. The injection mold of claim 17, wherein the mold cavity is compressed to a predetermined position where the thermoplastic material is allowed to solidify to form an ophthalmic lens having a light polarizing wafer encapsulated by thermoplastic material.

19. The injection mold of claim 15, wherein the flow control gate possesses a geometry designed to inject thermoplastic material into the mold cavity at low velocity and with a disoriented molecular chain structure with a low profile to facilitate quick solidification of the thermoplastic material in the flow control gate upon the stoppage of injection of thermoplastic material.

20. The injection mold of claim 19, wherein the flow control gate injects thermoplastic material into the mold cavity at a flow rate between approximately 0.8 g/min and 3.5 g/min.

21. The injection mold of claim 15, wherein the dynamic movement of at least one of the anterior mold component and the posterior mold component is utilized to control the volume and compression of the mold cavity to impart a desired birefringence on the ophthalmic lens formed in the mold cavity.

22. The injection mold of claim 15, wherein the dynamically moveable mold component exerts uniform compression over an entire surface of the ophthalmic lens being formed in order to uniformly distribute stresses and minimize stress induced birefringence in the ophthalmic lens.

* * * * *